(12) United States Patent
Kowalchuk

(10) Patent No.: US 7,835,940 B2
(45) Date of Patent: Nov. 16, 2010

(54) SYSTEMS AND METHODS FOR TARGETING CONSUMERS ATTITUDINALLY ALIGNED WITH DETERMINED ATTITUDINAL SEGMENT DEFINITIONS

(75) Inventor: Craig W. Kowalchuk, Aurora (CA)

(73) Assignee: Twenty-Ten, Inc., Toronto, Ontario (CA)

( * ) Notice: Subject to any disclaimer, the term of this patent is extended or adjusted under 35 U.S.C. 154(b) by 0 days.

(21) Appl. No.: 12/340,244

(22) Filed: Dec. 19, 2008

(65) Prior Publication Data

US 2009/0164308 A1    Jun. 25, 2009

Related U.S. Application Data

(63) Continuation of application No. 10/821,516, filed on Apr. 9, 2004, now Pat. No. 7,472,072, which is a continuation-in-part of application No. 09/511,971, filed on Feb. 24, 2000, now abandoned.

(60) Provisional application No. 60/461,805, filed on Apr. 11, 2003.

(51) Int. Cl.
*G06Q 10/00* (2006.01)
(52) U.S. Cl. ...................................................... 705/10
(58) Field of Classification Search .................... 705/10
See application file for complete search history.

(56) References Cited

U.S. PATENT DOCUMENTS

| | | | |
|---|---|---|---|
| 5,041,972 A | 8/1991 | Frost | |
| 6,061,658 A | 5/2000 | Chou et al. | |
| 6,233,564 B1 | 5/2001 | Schulze, Jr. | |
| 6,236,977 B1 | 5/2001 | Verba et al. | |
| 6,285,983 B1 | 9/2001 | Jenkins | |
| 6,286,005 B1 | 9/2001 | Cannon | |
| 6,430,539 B1 | 8/2002 | Lazarus et al. | |
| 6,539,392 B1 | 3/2003 | Rebane | |
| 6,623,040 B1 | 9/2003 | Foley et al. | |
| 6,970,830 B1 | 11/2005 | Samra et al. | |

FOREIGN PATENT DOCUMENTS

WO    WO 9922328    5/1999

OTHER PUBLICATIONS

Ling, C.X., Data Mining for Direct Marketing: Problems and Solutions, The University of Western Ontario, Department of Computer Science, Dec. 1998, pp. 1-7.

Seller et al, Center for Research on Information Technology and Organizations, Dec. 1999, eScholarship Repository, University fo California, pp. 1-46.

(Continued)

*Primary Examiner*—Romain Jeanty
(74) *Attorney, Agent, or Firm*—Reed Smith LLP

(57) ABSTRACT

Disclosed herein are systems and methods for selecting a target group of consumers from a larger group of consumers in a computer database. Thus, for a given brand and marketing objective, the systems and methods provide for identifying the dimensions that define a relevant attitudinal consumer segment (or segments). In addition, the systems and methods select consumers, from an in-house or third party database containing appended variables, who are most attitudinally aligned with the target segment definition(s).

19 Claims, 2 Drawing Sheets

OTHER PUBLICATIONS

Anand, S.S. et al., A Data Mining Methodology for Cross-Sales, Oct. 1998, pp. 1-13.

Jackson, et al., Strategic Database Marketing, 1996, NTC Business Books, pp. 89-96, 102-103,158-159, 161-163, 168-187.

Database Marketing: Improving Service and Profitability by Segmenting Customers . . . , American Banker, Sep. 1998, vol. 163, Issue 176, Start ;. 30A, Retrieved from Proquest Direct.

O'Sullivan, O., Bringing Your Commercial Customer Into Focus, www.banking.com, Jan. 22, 1998, 4 pages Retrieved from: google.com and archive.org.

Hottest Technology, Computer Business Review, Oct. 1, 1996, vol. 4, No. 10, 2 pages, Retrieved from: Dialog.

Lach, Jennifer, Data Mining Digs In, American Demographics, Jul. 1999, 4 pages, Retrieved from: Dialog.

Kress et al., Forecasting and Market Analysis Techniques, Quorum Books, 1994, pp. 29-54.

Weinstein, A., Market Segmentation, McGraw Hill, 1994, pp. 52-64.

Mugo, F.W., Sampling in Research, http: trochim.human.cornell.edu/tutorial/mugo/tutorial.htm, Feb. 10, 1998, pp. 1-8, Retrieved from google.com and archive.org.

Clayton, How to Handle Product Evaluation Procedure, Feb. 1961, National Association of Accountants; Retrieved from ACM Digital Library.

Database Marketing Expands Profitability, Bank Automation News, Aug. 1996, p. 1, Obtained from Proquest Direct.

Tyler, Can My Company Profit from Database Marketing?, Chain Store Age Executive with Shopping Center Age, New York, Mar. 1994, pp. 1-2.

Bort, J., Data Mining's Midas Touch, InfoWorld, Apr. 1996, vol. 18, Issue 18, Start p. 69, Retrieved from Proquest Direct.

Nash, E. L., Database Marketing, the Ultimate Marketing Tool, 1993, McGraw-Hill, Inc., pp. 41-43, 90-91, 128-163.

SYSTEMS AND METHODS FOR TARGETING CONSUMERS ATTITUDINALLY ALIGNED WITH DETERMINED ATTITUDINAL SEGMENT DEFINITIONS

CROSS-REFERENCE TO RELATED APPLICATION

This application is a continuation of U.S. patent application Ser. No. 10/821,516, filed Apr. 9, 2004, now U.S. Pat. No. 7,472,072 which is a continuation-in-part of U.S. patent application Ser. No. 09/511,971, filed Feb. 24, 2000, now abandoned. U.S. patent application Ser. No. 10/821,516 also claimed the benefit of the earlier filing date of U.S. Provisional Patent Application No. 60/461,805, filed Apr. 11, 2003.

TECHNICAL FIELD

Disclosed embodiments herein relate generally to target marketing systems and methods, and more particularly to customized target marketing systems and methods to identify consumer segments for a given marketing objective based on attitudinal dimensions, and to locate individual consumers who are attitudinally aligned with the segment definitions, for purposes of direct marketing.

BACKGROUND

In the quest for new business opportunities, there has been a growing proliferation of products and services seeking to more relevantly satisfy consumer needs. This has heightened competition and furthered a desire by marketers to look for tools that can more precisely identify optimal groups of consumers. Previous targeting methods used historical information to determine what type of consumer had previously used product/service categories or brands. These factors were used to predict which consumers would likely buy in the future.

Previous approaches to target marketing prioritized consumers based on category and volume of brand usage. These consumer targeting efforts were largely based on demographic and geodemographic factors. A first approach typically involved the administration of a survey to measure consumer usage levels pertaining to specific products, services and brands. These surveys also gathered general demographic information for each respondent. Standard analysis techniques were then applied to study the results and identify optimal demographic segments for targeting marketing efforts. Geodemographic systems were then developed that categorize the entire marketplace of consumers into a specific number of neighborhood types. These neighborhood types were typically classified according to demographic factors.

Unfortunately, targeting methods based on demographics and geodemographics have several drawbacks. For example, both methods assume that all consumers within a defined demographic or geodemographic sub-set are equally attractive. As such, these methods typically do not distinguish between individual consumers within the same group. In addition, neither method considers attitudinal variables, even though attitudinal variables greatly influence the future purchasing behavior of consumers. Because of these drawbacks, volume-only marketing techniques often do not meet the financial needs of marketers. Additionally, there has also been a growing consensus that demographic and other conventional targeting methodologies would be enhanced if attitudinal filtering were also applied. In response to this, businesses are increasingly striving to find ways of identifying and reaching groups of consumers who tend to "think alike" with respect to their brand and market segment. Some examples of groups divided based on attitudinal variables are:

Early adopters of high tech consumer products;
Risk-averse buyers of investment securities;
Prestige-seeking buyers of luxury automobiles;
Fashion conscious clothes buyers.

As may be seen in these examples, grouping of potential customers using attitudinal characteristics and definitions results in segments defined by more than mere demographics and the like. For example, rather than creating a group of potential luxury car buyers based on demographic information like income and past purchases, attitudinally-based segments look to the reasons for purchasing behavior. In this example, this results in a group of potential luxury car buyers that are grouped based on the reason for purchasing a luxury car (e.g., seeking prestige, professional appearance, etc.).

There is therefore a high level of interest in a customized target marketing system based on attitudinal dimensions. While other methods of attitudinal segmentation currently exist, there is need for a system that can also identify individual consumers who align attitudinally with the segment definitions. This combination enables direct-to-consumer contact with attitudinally relevant products and marketing offers. Moreover, such a system would be even more beneficial to marketers by having the capability to help determine the attitudinally-based segment definitions themselves, which may then be customized to each particular product being marketed.

BRIEF SUMMARY

Disclosed herein are systems and methods for selecting a target group of consumers from a larger group of consumers in a computer database. Thus, for a given brand and marketing objective, the systems and methods provide for identifying the dimensions that define a relevant attitudinal consumer segment (or segments). In addition, the systems and methods select consumers, from an in-house or third party database containing appended variables, who are most attitudinally aligned with the target segment definition(s).

In one embodiment, a method includes providing at least non-attitudinal variables for each consumer in the database, choosing a random subgroup of consumers from the larger group, and gathering attitudinal data, which is unavailable on the database, from each member of the subgroup. The method also includes creating attitudinal segments defined by attitudinal dimensions based on the attitudinal data, and assigning each member of the subgroup to one of the attitudinal segments using the attitudinal data corresponding to each member of the subgroup. The method includes identifying a plurality of the non-attitudinal variables for each member of the subgroup based on strength of relationship between each of the non-attitudinal variables of the subgroup members and the dimensions that define each member's corresponding attitudinal segment. The method further includes calculating a probability score for each member of the subgroup based on a degree of fit between each member of the subgroup and their corresponding attitudinal segment. The method also provides for developing mathematical algorithms each corresponding to a separate one of the attitudinal segments and capable of substantially predicting the probability score for each of the subgroup members with respect to their corresponding attitudinal segment using the identified plurality of non-attitudinal variables and their corresponding calculated probability score. The method still further includes calculating a probability score for each of the consumers in the larger group based on a degree of fit between each of the consumers in the larger group and any of the attitudinal segments by applying at least one of the developed algorithms to each consumer in the larger group. Finally, the method provides for selecting the target group of consumers from the larger group based on the calculated probability scores of the consumers in the larger group.

In another aspect, a system includes a database storing the larger group of consumers and storing at least non-attitudinal variables for each consumer in the database, a subgroup of consumers randomly selected from the larger group, and a list of attitudinal data unavailable on the database gathered from each member of the subgroup, where the attitudinal data is based on attitudinal variables. In addition, the system further includes a computer coupled to the database, where the computer is configured to receive the list of attitudinal data. Furthermore, the computer is configured and programmed to create attitudinal segments defined by attitudinal dimensions based on the received attitudinal data, assign each member of the subgroup to one of the attitudinal segments using the attitudinal data corresponding to each member of the subgroup, and to identify a plurality of the non-attitudinal variables for each member of the subgroup based on strength of relationship between each of the non-attitudinal variables of the subgroup members and the dimensions that define each member's corresponding attitudinal segment. The computer is also configured and programmed to calculate a probability score for each member of the subgroup based on a degree of fit between each member of the subgroup and their corresponding attitudinal segment, and develop mathematical algorithms each corresponding to a separate one of the attitudinal segments and capable of substantially predicting the probability score for each member of the subgroup with respect to their corresponding attitudinal segment using the identified plurality of non-attitudinal variables and their corresponding calculated probability score. The computer is still further configured and programmed to calculate a probability score for each of the consumers in the larger group based on a degree of fit between each of the consumers in the larger group and any of the attitudinal segments by applying at least one of the developed algorithms to each consumer in the larger group, and then select the target group of consumers from the larger group based on the calculated probability score for each of the consumers of the larger group.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION OF PREFERRED EMBODIMENTS

Figure 1:
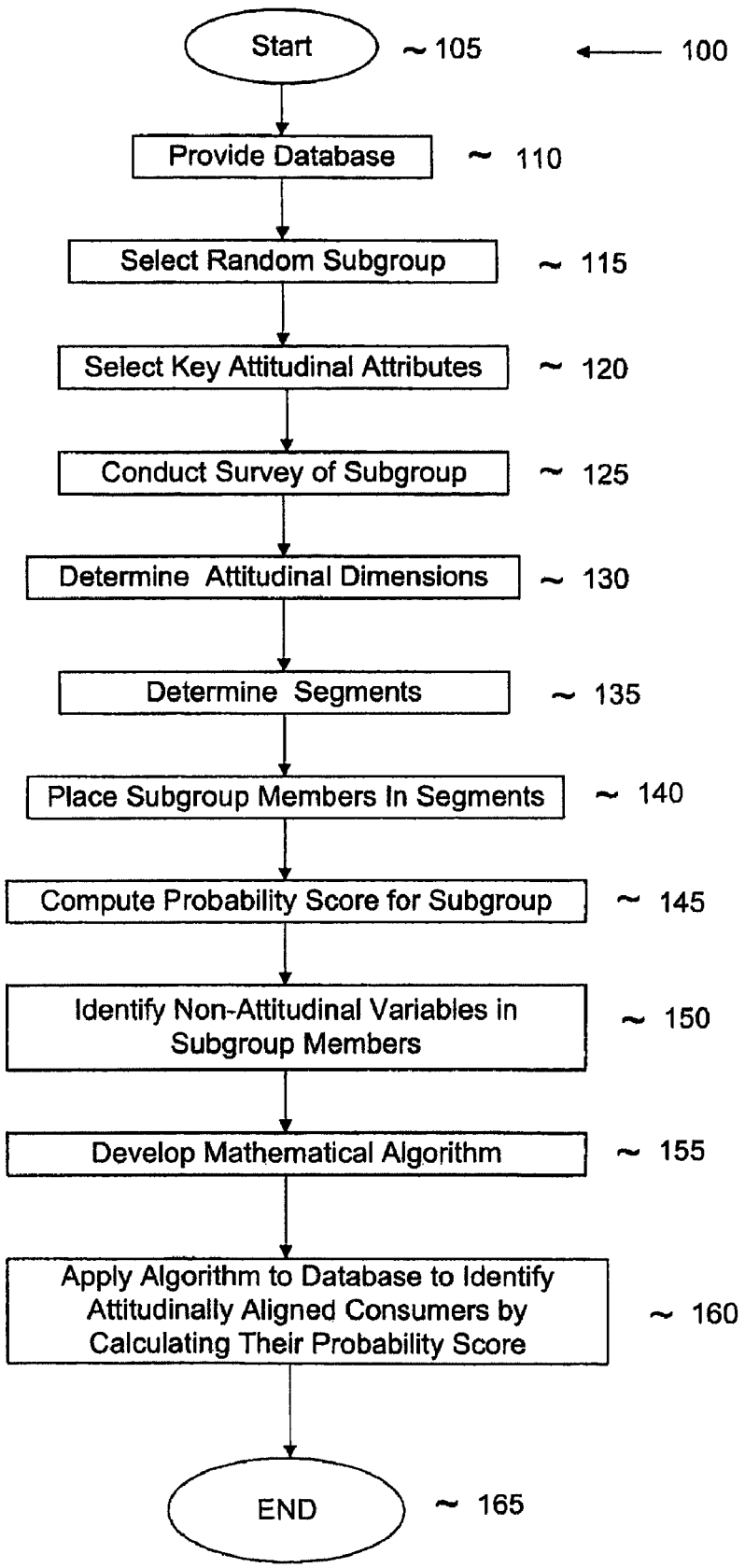
FIG. 1 illustrates one embodiment of a process of selecting consumers for targeted marketing campaigns conducted according to the principles disclosed herein.

Referring initially to FIG. 1, illustrated is one embodiment of a process of selecting consumers for targeted marketing campaigns conducted according to the principles disclosed herein. The process begins at a start block 105. At block 110, a large database of potential consumers is provided. A consumer database contains a plurality of data variables for each member of the group. Typically there are over 300 variables, but this number can vary significantly. The variables can relate to many different types of data. The data can fall into categories including lifestyle, demographic, financial, home-ownership, vehicle registration, and consumer purchase behavior variables. A person skilled in the art will appreciate that one can include many different types of consumer data variables on a consumer database. In a preferred embodiment, the database has lifestyle and demographic variables for over 85,000,000 individual consumers.

At block 115, a subgroup is selected from the larger database of potential customers. To carry out the marketing systems and methods disclosed herein, a user randomly selects a subgroup of consumers from the overall group contained on the database. In one embodiment, the subgroup includes 20,000 people, however no limit is intended. The subgroup is randomly selected from the database using standard selection software that is well known in the art. Alternatively, it is possible to pre-sort the group in order to select individuals based on pre-selected variables, which are typically objective variables. For example, one may randomly select a subgroup of individuals in the group of males between 15-24 years of age. This may be appropriate for a particular type of product such as disposable razors.

Turning to block 120, key client-specific attitudinal attributes corresponding to the particular product or service offered by the client may next be selected. Examples of such attitudinal attributes include, but are not limited to:
    importance of quality over price
    importance of price sensitivity in home computers
    importance of brand name appeal to the consumer
    preference for powerful cars over economy cars
    brand name loyalty importance of value/price perceived status/image of customer for using or wearing a brand name product
    importance of style/fashion
    technology loving/hating
    importance of convenience in selecting a retailer Of course, other attributes that are based on the attitudes that consumers have when making the decision to purchase products or services are also envisioned as potential attitudinal attributes. Thus, the attitudinal attributes selected are not directed to purchase volume history, but rather towards the attitudes that consumers have, and which related to future purchase decisions.

Once the attitudinal attributes have been selected, a survey (or other means for gathering attitudinal data) is conducted on the subgroup members, as shown in block 125, based on the attitudinal attributes. When creating the survey, attitudinal statements/questions are typically created in such a way that elicits a quantitative response from the subgroup members. Stated another way, the survey will frame attitude-based statements/questions in various ways to effectively measure the degree of attitudinal commitment present in each survey respondent. One such technique involves exposing members of the subgroup to an attitudinal statement and asking them to rate their level of agreement on a 5 point scale, where 1 represents "completely disagree" and 5 represents "completely agree". Another approach involves giving members of the subgroup a set of attitude statements and asking them to identify which statement is most important in their purchase decision and which one is least. In one embodiment of the survey administered, approximately 1,500-2,000 completed surveys are typically employed for the remainder of the process.

Next at block 130, the results of the survey are used to identify key attitudinal dimensions. This process involves the use of "factor analysis". In this step, individual attitude statements displaying survey preferences that are correlated are grouped together to form attitudinal dimensions. For example, the statements: "I love to shop for stylish clothes", "I would pay a premium for stylish clothes" and "I prefer style over quality" could be grouped together to form the attitudinal dimension: "Stylish clothing is very important." Factor analysis looks for commonality. Commonality may be determined by looking at exact matches of answers on the survey between several subgroup members. For example, scaled answers typically would include answers where members assign weights like "very important," "of average importance" or "not very important" to specific attitudinal statements. In the end, factor analysis is used to group individual attitudinal statements/questions together, thus creating multiple attitudinal dimensions at block 130, for use in identifying relevant consumer segments.

Next, at block 135, a number of attitudinal segments are created for segregating the members of the subgroup, and each segment is defined by definitions based on one or more of the determined attitudinal dimensions found above. More specifically, based on the desired number of segments, statistical techniques are applied to group individuals whose survey response patterns are characterized by at least two elements of homogeneity. In a preferred embodiment, only two elements of homogeneity are employed, as judged against the total surveyed population. First are the responses of the surveyed subgroup members that are overdeveloped in the same dimensions, and second are the responses of the subgroup members that are underdeveloped in corresponding other dimensions. In addition, the disclosed process seeks to find groups of individuals whose response patterns are as mutually exclusive from members of other segments as possible. The result of this part of the cluster analysis is the creation of the set of attitudinally defined consumer segments. The following example illustrates a set of attitudinal segmentation clusters for consumers who purchase children's clothing:

a) "My children only need clothes that are functional and durable."
b) "I buy my children stylish clothes regardless of the price."
c) "I buy my children the best clothes I can afford."
d) "My children are deserving of the best clothes."
e) "I dress my children so they'll be popular among their friends."
f) "I don't care about style; to me quality is the most important factor."

In this example, each of the above segments would have an underlying set of attitudinal dimensions.

The second part of this "cluster analysis" occurs at block 140, where members of the subgroup are assigned to certain segments that have been previously defined. The assignment of the subgroup members to specific segments is done by determining which of the available segments' underlying attitudinal dimensions best fits with each member's pattern of survey responses. A probability score is calculated at block 145 for each individual in the subgroup based on the degree of fit of each subgroup member with the segment to which each member was assigned. In one embodiment, these calculations occur at substantially the same time as consumers are being segregated into their respective segment. This is accomplished by comparing the responses of the individual members with the attitudinal dimensions that provided the segment definition. Typically, the probability scores will be discriminating enough to illustrate distinctions between subgroup members who, for example, perfectly fit in a segment, very closely fit in a segment, do not fit very close to a segment, and those that have opposite attitudes to members in a particular segment. As a result, although a number of subgroup members may be placed in the same segment, the probability scores provide for a ranking of the members in each segment based on how well they fit in their segment.

At block 150, specific non-attitudinal variables common to each cluster of subgroup members are then identified. These will be used in the subsequent development of mathematical algorithms, one related to each of the segments created. Non-attitudinal variables (or sometimes called "non-behavioral variables" as in U.S. application Ser. No. 09/511,971 cited above) are objective variables of each consumer that are not based on the purchasing attitudes of the consumer. Examples of non-attitudinal variables include, but are not limited to, gender, income, age, home-ownership, parenthood, education, geographic location, ethnicity, etc. Such variables do not include attitudinal variables like brand loyalty, price sensitivity, importance of quality, preference for style, and attraction to brand proposition. These segment-specific non-attitudinal variables would be a subset of all the non-attitudinal variables stored in the database. In an advantageous embodiment, the database includes over 300 non-attitudinal variables for each consumer, however any number of non-attitudinal variables may be available.

In an advantageous embodiment, such segment-specific non-attitudinal variables are identified as those that best correlate with the subgroup members who have been assigned to a particular segment. In some embodiments, at least two of the identified non-attitudinal variables may be cross-correlated, that is, they share a common causal relationship and therefore are not independent of each other. In such cases one of these variables will be eliminated, since using both may overstate the degree of importance given to the common characteristic.

At block 155 a predictive mathematical algorithm is developed for each segment. Each algorithm uses the segment-specific non-attitudinal variables to predict the probability scores given to each of the subgroup members belonging to that particular segment. Each algorithm typically uses linear regression. Specifically, the probability scores of the subgroup members (i.e., based on degree of fit of those members relative to the segment definition) are employed as the dependent variables in the development of the predictive algorithms. Once developed, the algorithms will compute a probability score for any individual in a database who has the segment-specific attributes appended. At block 160, the algorithm for a particular segment is applied to all consumers in the database to calculate a probability score for each member in the database that represents that person's degree of fit with that segment definition. The higher the score, the better the fit within that segment. In addition, multiple algorithms may be applied to the consumers in the database to determine which segment they most closely fit. In either embodiment, all of the consumers in the database may be ranked in order based on their resulting probability scores, and this order would typically change for each of the different segments/algorithms employed.

In an exemplary embodiment, the optimal target group of consumers selected from the database represents about 5% to 25% of the top-ranked consumers in the database, however any size target group may be selected depending on marketing requirements and the level of predictive accuracy that is acceptable to the client. In this manner, the system creates attitudinal segments that mirror the segments previously created for the members of the subgroup. Furthermore, it assigns optimally-aligned (i.e., the same or substantially similar attitudinal attributes) target consumers from the larger database accordingly. As result of the methodology described above, the non-attitudinal variables (as mathematically weighted by the algorithm) become predictive of attitudinal variables not available on the database. If a segmentation cluster is defined by attitudinal attributes that are desirable to the marketer, these identified non-attitudinal variables can now be used to predictively identify members in that cluster. The process then ends at block 165 where the selected consumers are targeted for the marketing of goods and/or services.

What follows is an example of the development of a mathematical algorithm for attitudinal segment "X", which further illustrates an application of the disclosed process. In accordance with the above-mentioned process, nine exemplary non-attitudinal variables that could apply to attitudinal segment "X" are shown in Table 1. These are typically found on the database associated with each of the consumers in the database.

TABLE 1

| Name of Non-Attitudinal Variable | Variable Configuration | Value for an Individual |
|---|---|---|
| 1) Value of home | Expressed as an index: ($ value of individual's home/average value of neighborhood homes × 100) | 147 |
| 2) Time in current residence | Years | 5 |
| 3) Purchase beauty aids | "yes" = 1; "no" = 0 | 0 |
| 4) Subscribe to a fitness magazine | "yes" = 1; "no" = 0 | 1 |
| 5) Read the Bible | "yes" = 1; "no" = 0 | 0 |
| 6) Surf the internet | "yes" = 1; "no" = 0 | 1 |
| 7) Purchase by mail order | "yes" = 1; "no" = 0 | 0 |
| 8) Donate to environmental causes | "yes" = 1; "no" = 0 | 0 |
| 9) Age 18-24 | "yes" = 1; "no" = 0 | 1 |

The values in the column labeled "Value for an Individual" will be used to illustrate the development and application of the mathematical algorithms corresponding to attitudinal segment "X". Accordingly, a typical mathematical algorithm correlating to attitudinal segment "X" may thus be developed as disclosed herein using the non-attitudinal variables as the independent variables and the probability score for a subgroup member (the probability that that individual is a member of attitudinal segment "X") as the dependant variable. The algorithm is set forth in equation (1):

$$\text{Probability} = \frac{33.47 + 0.68\begin{pmatrix}\text{Value}\\\text{of}\\\text{Home}\end{pmatrix} - 0.94\begin{pmatrix}\text{Time\_in}\\\text{Current}\\\text{Residence}\end{pmatrix} - 13.5\begin{pmatrix}\text{Purchases}\\\text{Beauty}\\\text{Aids}\end{pmatrix} + 17.71\begin{pmatrix}\text{Subscribes}\\\text{to\_Fitness}\\\text{Magazines}\end{pmatrix} - 14.36\begin{pmatrix}\text{Reads}\\\text{the}\\\text{Bible}\end{pmatrix} + 10.00\begin{pmatrix}\text{Surfs}\\\text{the}\\\text{Internet}\end{pmatrix} - 20.94\begin{pmatrix}\text{Purchases}\\\text{By\_Mail}\\\text{Order}\end{pmatrix} + 9.07\begin{pmatrix}\text{Donates\_to}\\\text{Environmental}\\\text{Causes}\end{pmatrix} + 11.67\begin{pmatrix}\text{Age}\\18-24\end{pmatrix}}{100} \quad (1)$$

Once the algorithm has been developed and is ready to be applied to a database, a computer (see FIG. 2) is configured and programmed to insert the values of the non-attitudinal variables for each individual into the formula, and calculates the corresponding probability score. Using the values from TABLE 1, equation (2) sets forth the algorithm:

$$\text{Probability} = \frac{33.47 + 0.68(147) - 0.94(5) - 13.5(0) + 17.71(1) - 14.36(0) + 10.00(1) - 20.94(0) + 9.07(0) + 11.67(1)}{100} \quad (2)$$

$$= 78.146\%$$

In the end, the attitudinal approach disclosed herein may be distinguished from other consumer targeting systems because of its identification of non-attitudinal variables based on attitudinal attributes for consumers, rather than on consumers' purchase volume history. Thus, the disclosed approach can identify-consumers for targeted marketing that may have never purchased a vendor's product in the past, but have the attitudinal attributes that are the same or similar to the type of person who has and does purchase the vendor's product. For example, if the vendor sells luxury cars, a conventional marketing analysis will typically identify consumers who have a high income. However, it is clear that not all high-income earners choose to own the same brand of luxury car. The disclosed approach will assist the vendor by identifying a subset of high-income earners with attitudinal characteristics similar that predispose them to their particular brand's features and image. As a result, the vendor may now target potential purchasers who would likely not have been identified by systems employing purchase history criteria, demographics, or lifestyles criteria. This approach will improve efficiency and reduce marketing costs.

Thus, by identifying potential consumers for targeting using the disclosed process, as well as using systems employing such a process, several advantages are realized. For instance, the disclosed approach provides the advantage of requiring the attitudinal survey to be administered to only a fraction of the entire database population, typically 1,500-2,000 consumers. Customer databases generally contain millions of names and a comprehensive survey would be prohibitively expensive. In addition, it is not necessary to know in advance the attitudinal segment definitions, since the system is fully capable of deriving these. More specifically, in place of block 120 described above, the disclosed approach may be used to discover desirable attitudinal attributes (rather than knowing them ahead of time) by conducting a survey as described above, and then clustering the subgroup members into segments based on the similarity and differences of their responses. Once the members are clustered into segments based on survey response, the prevailing attitudinal attributes for each segment may be observed.

Figure 2:
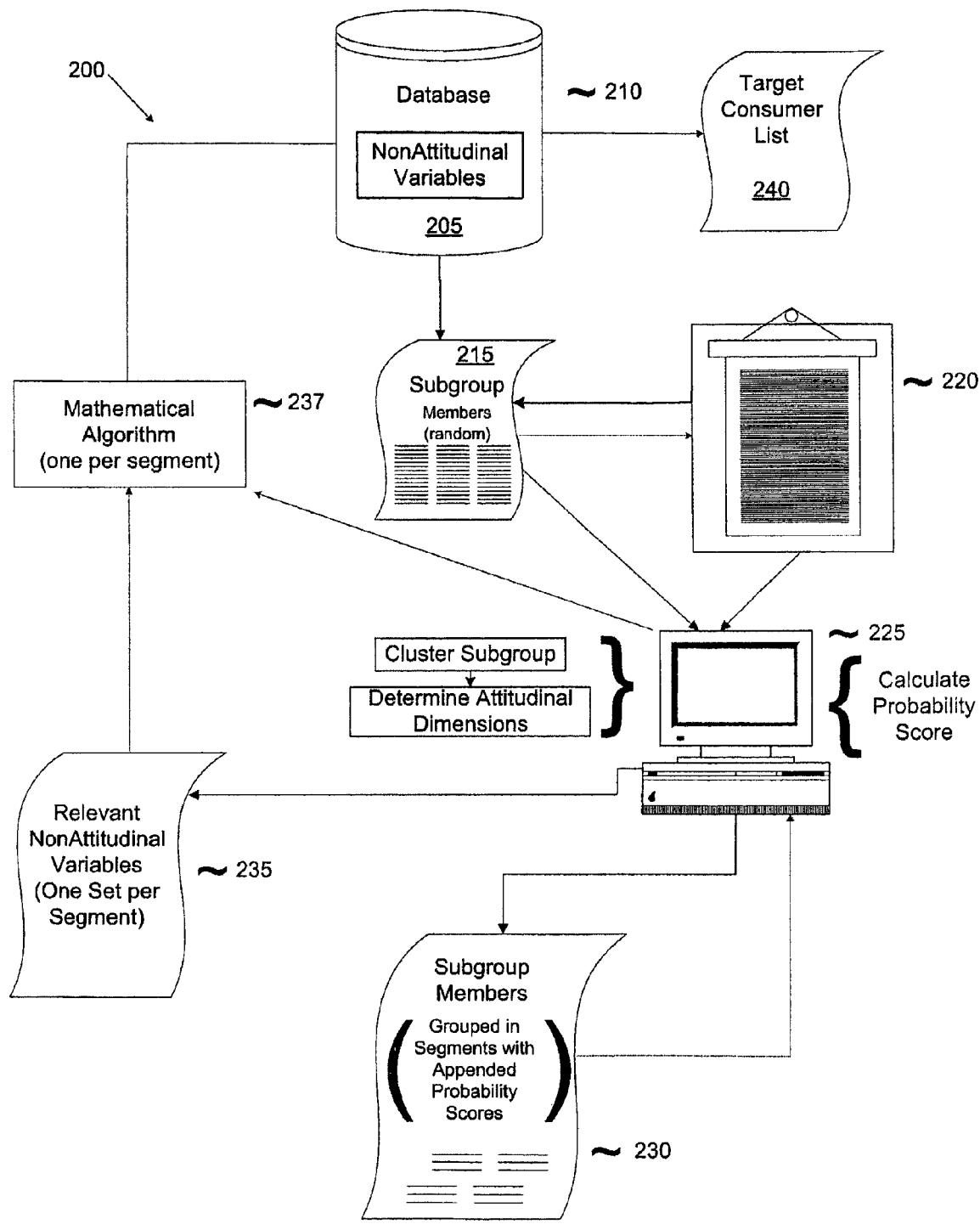
FIG. 2 illustrates a computer-based system configured to select consumers for targeted marketing campaigns according to the principles disclosed herein.

Turning now to FIG. 2, illustrated is a computer-based system 200 configured to select consumers for targeted marketing campaigns according to the principles disclosed herein. The system 200 includes a large database 205 of consumers, which may be similar to the database discussed with reference to FIG. 1. As illustrated, the database 205 of consumers is configured to contain substantial information about the consumers, including non-attitudinal variables 210 particular to each stored consumer. These non-attitudinal variables 210 may be in addition to any number of variables, including purchase transaction variables, as discussed above.

To identify potential consumers based on attitudinal characteristics and attributes, the system 200 is configured to select a subgroup 215 from the larger database 205 of potential customers. As before, there is no limit to the size of the selected subgroup 215. In a specific embodiment, the subgroup 215 is randomly selected from the database 205 using conventional selection software running on a computer. Such software may also pre-sort the subgroup 215 based on pre-selected characteristics, as discussed above. The system 200 also includes a survey 220 that is created to include attitudinal statements that elicits quantitative responses from the subgroup members, and thus will frame attitude-based statements/questions in various ways to effectively measure the degree of attitudinal commitment present in each subgroup member. These attitudinal statements are based on specific attitudinal attributes, such as those listed above, that correspond to the particular product or service advertised by the vendor. The survey is then conducted on the subgroup members 215, as illustrated.

The system 200 still further includes one or more computers or other types of computing device 225 coupled to the database 205. The computer 225 may be of conventional design, but be configured to receive the survey 220 questions and results for processing in accordance with the principles disclosed herein. Specifically, the computer 225 is configured to conduct the "factor analysis," e.g., the responses to survey 220 are statistically organized into attitudinal dimensions. The computer 225 then applies statistical techniques to create a list of attitudinally-defined segments 230, and then segregates ("clusters") the subgroup members 215 into those segments based on the homogeneity of survey 220 response patterns among members (relative to the dimensions). The computer 225 is also configured to compute and append a probability score for each individual in the segmented clusters 230. As before, this calculation is based on the degree of fit of each subgroup member with the segment to which each member was assigned. This is done by comparing the responses of the members to the attitudinal dimensions the computer 225 used to actually define the segments.

For each subgroup segment in the list 230, the computer 225 also determines the subset of non-attitudinal variables 235 (from those available in 210) which best correlate with the members it has assigned to the respective segment. These non-attitudinal variables may be identified using the technique disclosed above. The computer 225 is also configured to develop a predictive mathematical algorithm 237 for each segment. Each algorithm uses the segment-specific non-attitudinal variables 235 to predict the probability scores given to each of the subgroup members belonging to the particular segment. The algorithms typically use step-wise linear regression. Specifically, the probability scores (i.e., degree of fit of members relative to the segment definition) are employed as the dependent variables in the development of the predictive algorithms.

Once developed, the algorithms 237 will be able to compute a probability score for all individuals in database 205 with the segment-specific, non-attitudinal variables 235 appended. Once applied to the database 205, each individual will receive an appended probability score indicating their degree of fit with each segment. For example, if the computer 225 has been configured to identify five segments in 230, there will be five probability scores appended to each name in 205, one per segment. For any given segment, the names in database 205 will then be rank ordered by the computer 225 based on the corresponding probability scores; the higher the score the better the fit in the particular segment. The resulting list of target consumer names 240 may now be used by a vendor to target potential customers. Since those at the top of the list will typically have a better fit with the segment definition than those further down, vendors will typically select names in the top 5-25% of the list for marketing purposes (although further penetration of the list is possible). The computer 225 will be configured to provide the desired selection of names from 240. As a result, system 200 will have identified potential purchasers who would likely not have been identified by systems employing purchase history criteria, demographics, or lifestyle criteria. This would improve efficiency and reduce marketing costs.

Also, in accordance with the process discussed above, the computer 225 may be configured to actually discover the underlying attitudinal dimensions that form the basis for segment definitions, rather than being programmed with them ahead of time. This is a valuable product of the disclosed systems and methods because frequently clients are unaware of how a database or market can be segmented along attitudinal lines. This is accomplished by the computer 225 processing the survey results in the fashion described above, and then creating attitudinal dimensions and defining attitudinal segments based on the similarity and differences of survey responses and response patterns. Once these segments are so defined, the prevailing attitudinal attributes for each segment may be observed. Of course, any of the processing capabilities of the computer 225, as well as other potential components in the system 200, may be embodied in either hardware or software, or both, without limitation.

While various embodiments of systems and methods for selecting consumers for targeted marketing campaigns based on attitudinal attributes of the consumers have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method, implemented at least in part by a computing device, the method comprising:
   with the computing device, receiving attitudinal data associated with a first plurality of consumers;
   with the computing device, associating a first subgroup of the first plurality of consumers with a first attitudinal segment based on the received attitudinal data;

with the computing device, determining a first attitudinal segment based score for at least one consumer in the first plurality of consumers, wherein determining the first attitudinal segment based score comprises determining the score based on:
attitudinal data associated with the at least one consumer in the first plurality of consumers; and
at least one attitudinal dimension associated with the first attitudinal segment; and
with the computing device, associating at least one non-attitudinal variable with each consumer in the first plurality of consumers, wherein a value of the at least one non-attitudinal variable associated with a first one of the first plurality of consumers is different from a value of the at least one non-attitudinal variable associated with a second one of the first plurality of consumers.

2. The method of claim 1, wherein associating the subgroup comprises associating the subgroup based on at least one attitudinal dimension associated with the first attitudinal segment.

3. The method of claim 1, further comprising associating a second subgroup of the first plurality of consumers with a second attitudinal segment based on the received attitudinal data.

4. The method of claim 3, wherein associating the consumers associated with the second subgroup comprises associating consumers who are exclusive of the consumers associated with the first subgroup.

5. The method of claim 1, further comprising determining a second attitudinal segment based score for the at least one consumer.

6. The method of claim 1, further comprising determining at least one attitudinal segment based score for each consumer in the first plurality of consumers.

7. The method of claim 1, wherein associating the at least one non-attitudinal variable comprises associating an objective variable.

8. The method of claim 1, further comprising defining at least one attitudinal dimension based on the received attitudinal data.

9. The method of claim 1, further comprising defining the first attitudinal segment based on the received attitudinal data.

10. The method of claim 1, further comprising defining at least one additional attitudinal segment based on the received attitudinal data.

11. The method of claim 1, further comprising:
defining a plurality of attitudinal dimensions based on the received attitudinal data; and
defining a plurality of additional attitudinal segments based on the defined attitudinal dimensions.

12. The method of claim 1, further comprising defining a predetermined number of additional attitudinal segments.

13. The method of claim 1, wherein associating the at least one non-attitudinal variable with each consumer in the first plurality of consumers comprises associating a plurality of non-attitudinal variables with each consumer in the first plurality of consumers.

14. The method of claim 1, further comprising determining a relationship between the following:
the first attitudinal segment based scores for each consumer in the first plurality of consumers; and
the non-attitudinal variables associated with the consumers in the first plurality of consumers.

15. The method of claim 14, wherein determining the relationship comprises performing a regression analysis.

16. The method of claim 1, further comprising utilizing a predictive model to generate a first attitudinal segment based score per consumer for each consumer in a second plurality of consumers.

17. The method of claim 16, further comprising determining a ranking of the first attitudinal segment based scores for the second plurality of consumers.

18. The method of claim 16, further comprising utilizing the predictive model to generate a second attitudinal segment based score per consumer for each consumer in the second plurality of consumers.

19. The method of claim 18, further comprising determining a ranking of the second attitudinal segment based scores for the second plurality of consumers.

* * * * *